United States Patent
Beller et al.

(10) Patent No.: US 11,379,706 B2
(45) Date of Patent: Jul. 5, 2022

(54) DISPERSED BATCH INTERACTION WITH A QUESTION ANSWERING SYSTEM

(71) Applicant: International Business Machines Corporation, Armonk, NY (US)

(72) Inventors: Charles E. Beller, Baltimore, MD (US); William G. Dubyak, Severna Park, MD (US); Palani Sakthi, Palatine, IL (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 15/952,860

(22) Filed: Apr. 13, 2018

(65) Prior Publication Data
US 2019/0318221 A1    Oct. 17, 2019

(51) Int. Cl.
G06N 3/00    (2006.01)

(52) U.S. Cl.
CPC .................... *G06N 3/006* (2013.01)

(58) Field of Classification Search
CPC .......... G06F 16/90332; G06F 16/2379; G06N 3/006
See application file for complete search history.

(56) References Cited

U.S. PATENT DOCUMENTS

| | | | |
|---|---|---|---|
| 9,020,926 B1 * | 4/2015 | Allon | G06F 16/3338 707/765 |
| 9,063,975 B2 | 6/2015 | Isensee et al. | |
| 9,117,194 B2 | 8/2015 | Liu | |
| 2004/0254917 A1 * | 12/2004 | Brill | G06F 16/3329 |
| 2010/0174527 A1 * | 7/2010 | Sadamasa | G06F 40/242 704/9 |
| 2011/0055189 A1 * | 3/2011 | Effrat | G06F 16/3322 707/706 |
| 2011/0125734 A1 | 5/2011 | Duboue et al. | |
| 2015/0235131 A1 | 8/2015 | Allen et al. | |
| 2016/0180438 A1 * | 6/2016 | Boston | G06Q 30/0282 705/26.7 |

(Continued)

OTHER PUBLICATIONS

Hobbs, et al., "From Question-Answering to Information-Seeking Dialogs," SRI International, Nov. 2002, 4 pages.

(Continued)

*Primary Examiner* — Sherrod L Keaton
(74) *Attorney, Agent, or Firm* — Troutman Pepper Hamilton Sanders LLP

(57) ABSTRACT

Embodiments are directed to interaction with an open-domain question and answer system by recognizing questions that are highly broad or abstract, and generating and processing a batch of questions expressing alternate, concrete instances of the more general, abstract question. Responses to all of the questions in the batch are considered as candidates, and the strongest general answers are returned. A weighted, ranked answer set, based on weighting individual concrete questions and scaling the answers proportional to the weight of the questions, is provided to the user. The approach, according to embodiments herein, addresses the need for responses to broad questions in which a response to any of a set of more concrete question instances may serve to answer the question.

20 Claims, 8 Drawing Sheets

(56) References Cited

U.S. PATENT DOCUMENTS

2017/0011742 A1* 1/2017 Jing .................. G10L 15/22

OTHER PUBLICATIONS

Borchardt, et al., "Knowledge Fusion for Question Answering," Computer Science and Artificial Intelligence Laboratory (CSAIL), 2007, Abstract.
Yuan et al., "Watson and Healthcare." IBM developerWorks, 2011.
"The Era of Cognitive Systems: An Inside Look at IBM Watson and How it Works" by Rob High, IBM Redbooks, 2012.

* cited by examiner

DISPERSED BATCH INTERACTION WITH A QUESTION ANSWERING SYSTEM

STATEMENT REGARDING FEDERALLY SPONSORED RESEARCH OR DEVELOPMENT

This invention was made with government support under 2013-12101100008 awarded by United States Defense Agencies. The government has certain rights to this invention.

BACKGROUND

In a question and answer system, users typically input a single question at a time for processing. The system processes and responds to the user input question as it is asked. Any further elaboration of the intent, scope, and appropriate answers to the question occur as a matter of processing or refining the input question. In an open-domain question and answer system, specific questions may include any subject matter, and available knowledge resources are designed for general use rather than for detailed modeling of a specific phenomenon or area of knowledge.

SUMMARY

Embodiments are directed to a computer-implemented method, a computer program product, and a system for answering general questions.

In an embodiment, the computer-implemented method is implemented in a system capable of answering questions, the system comprising a processor and a memory comprising instructions executed by the processor.

In an embodiment, the computer program product comprises a computer readable storage medium having program instructions embodied therewith, the program instructions executable by a processor.

In an embodiment, the system comprises a processor and a memory, which comprises instructions executed by the processor.

In an embodiment, the processor executes the steps of: receiving a general question by a user; running a first set of specific questions to obtain a set of specific answers to answer the general question; and returning at least one answer from the set of specific answers to the general question to the user.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
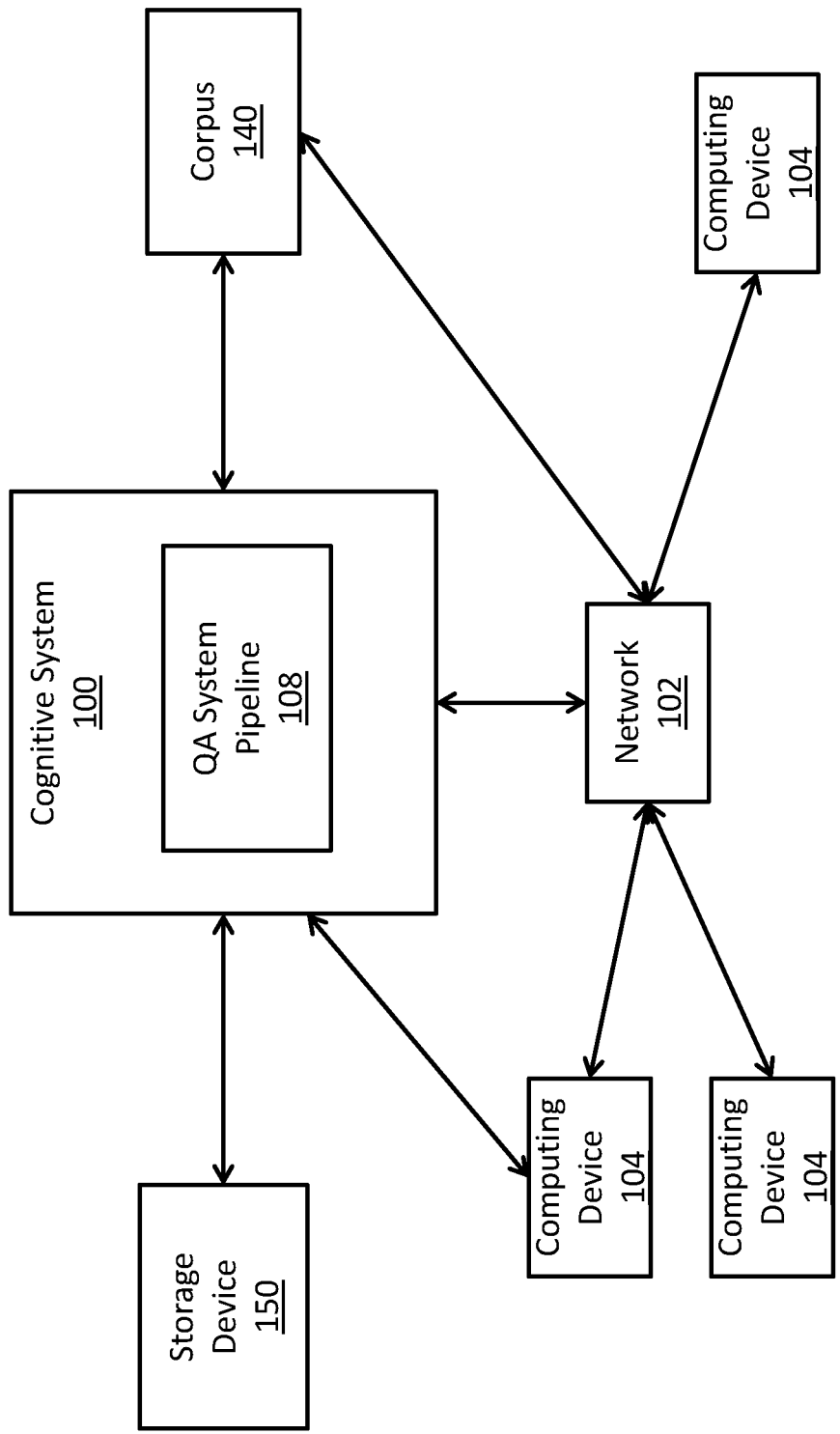
FIG. 1 depicts a schematic diagram of an embodiment of a cognitive system implementing a question and answer (QA) generation system in a computer network.

Due to typical question and answer systems processing individual user questions and seeking concrete, specific answers to these questions, a user with a general, abstract question may not receive any of the variety of factual responses that can answer the question. The user's intention in asking a broad question may be to find any response that satisfies one of several more concrete forms that the question can take. For example, a user may ask about the dominant belief system in a given organization. This is a general inquiry about a phenomenon that can take a variety of specific, factual forms. With the input limited to this specific question, however, the system either provides answers only for explicit statements of general belief systems for the organization, or requires an extensive modeling of potentially relevant types of belief systems. Such extensive modeling is feasible only for highly constrained domains, not for an open-domain question and answer system.

Embodiments are directed to interaction with an open-domain question and answer system by recognizing questions that are highly broad or abstract, and generating and processing a batch of questions expressing alternate, concrete instances of the more general information need. Responses to all of the questions in the batch are considered as candidates, and the strongest general answers are returned. The approach, according to embodiments herein, addresses the need for responses to broad questions in which a response to any of a set of more concrete question instances may serve to answer the question.

Embodiments herein utilize a question and answer system that accepts as an input a question and returns a set of scored/ranked outputs, as further described in detail below. Reference herein to "scored answers" is intended to cover the scored/ranked outputs comprising one or more of answers and evidence passages/references.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimics human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identity documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question and answer (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receives inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108, and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. The QA pipeline 108 is described in greater detail with regard to FIG. 8.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare." IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware.

Results from the corpus 140 are stored in storage device 150 associated with either the cognitive system 100, where the storage device 150 may be a memory, a hard disk based storage device, flash memory, solid state storage device, or the like (hereafter assumed to be a "memory" with in-memory representations of the acyclic graphs for purposes of description).

Figure 2:
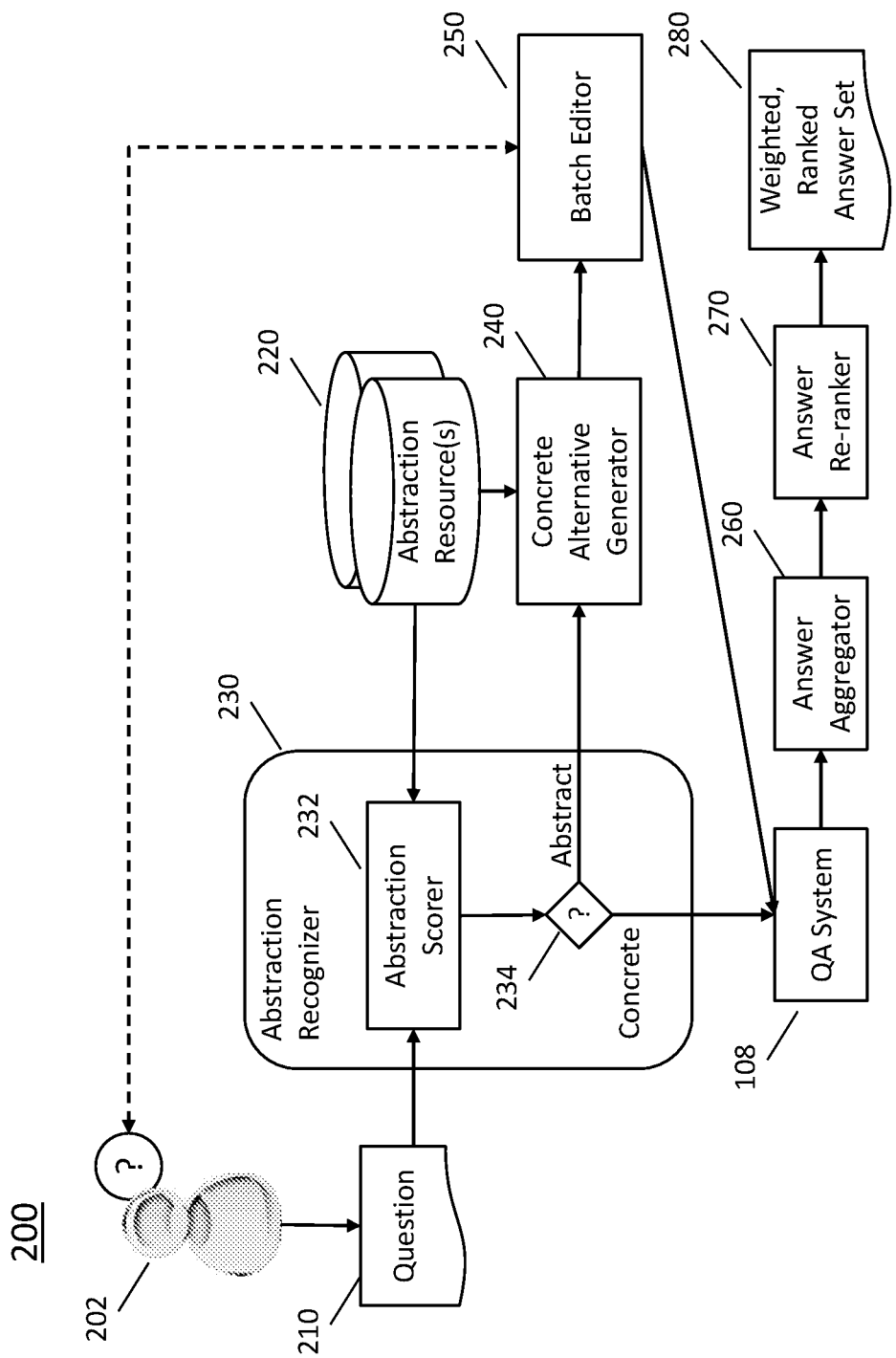
FIG. 2 is a block diagram illustrating components of and data flow in a system for answering general questions, according to an embodiment.

Now referring to FIG. 2, a block diagram 200 illustrates components of and data flow in a system for answering general questions, according to embodiments. An input question or questions 210 is provided by a user 202, via a provided user interface. Abstraction resources 220 are inputted for an abstraction recognizer 230/abstraction scorer 232 and a concrete alternative generator 240. If an abstraction score indicates the question is concrete (i.e., not abstract), the question is directly inputted to the QA system 108. If, on the other hand, the question is determined to be abstract, a batch editor 250 creates a weighted question batch based on output by the concrete alternative generator 240; the weighted question batch is inputted to the QA system 108 (described in greater detail with regard to FIG. 8). The weighted question batch may also be sent to the user 202 for confirmation or modification. The QA system 108 outputs answers to the weighted question batch to an answer aggregator 260, which generates ranked answer sets. An answer re-ranker 270 re-ranks the generated ranked answer sets based on weighting, to output a weighted, ranked answer set 280. Each component and step is described in further detail below.

The input question 210 entered by the user 202 is inputted, according to an embodiment, exactly as the user would provide it in a typical question and answer system.

The abstraction recognizer 230 is configured to recognize if the question is highly general or abstract. This is performed by an abstraction scorer 232 by judging the degree of abstraction of individual words in the question 210, based on predefined resources (i.e., abstraction resources 220), and combining these values into a single abstraction measure for the question as a whole.

Figure 3:
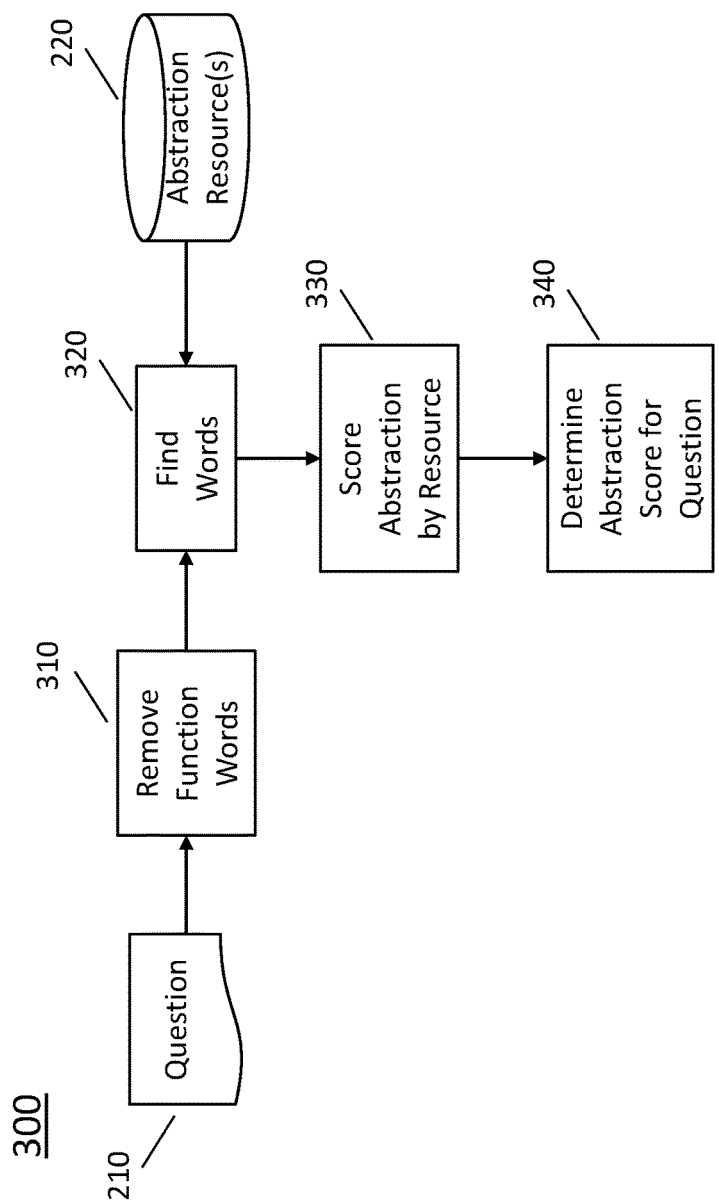
FIG. 3 is a flow diagram 300 illustrating a method for judging a degree of abstraction of individual words, according to an embodiment.

FIG. 3 is a flow diagram 300 illustrating a method for judging the degree of abstraction of individual words, according to an embodiment. For the input question 210, at 310, function words are discarded from the question 210. Function words include, according to an embodiment, prepositions, conjunctions, articles, and the like.

At 320, remaining words are found from the question 210, and, using an abstraction resource 220, at 330, an abstraction score is provided to the remaining words.

In an embodiment, a predefined resource (i.e., abstraction resource 220) for comparison may be a hierarchical taxonomy of concepts with words associated with each concept, and each word may be assigned a level of abstraction based on the location of its match in the taxonomy. According to an embodiment, higher levels in the taxonomy may be more abstract, and matches may be exact or may include variation in word forms.

In another embodiment, a predefined resource may include a set of known abstract terms, and each word may be judged to be abstract if it appears on the list and not abstract if it is not on the list.

In yet another embodiment, a predefined resource may include a combination of word counts in the corpus (e.g., corpus 140) and a taxonomy. A word is considered to be abstract if it does not occur over a threshold number of times in the corpus but words below it in the taxonomy, in combination, do occur over the threshold number.

Figure 5:
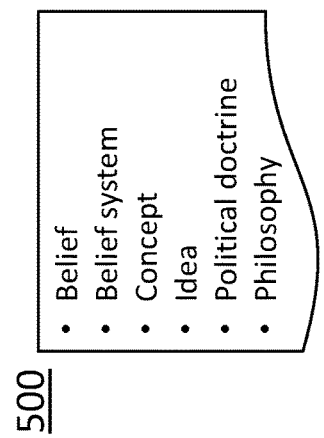
FIGS. 4, 5, and 6 are diagrams of exemplary predefined resources for obtaining an abstraction score for a word, according to various embodiments.
Figure 4:
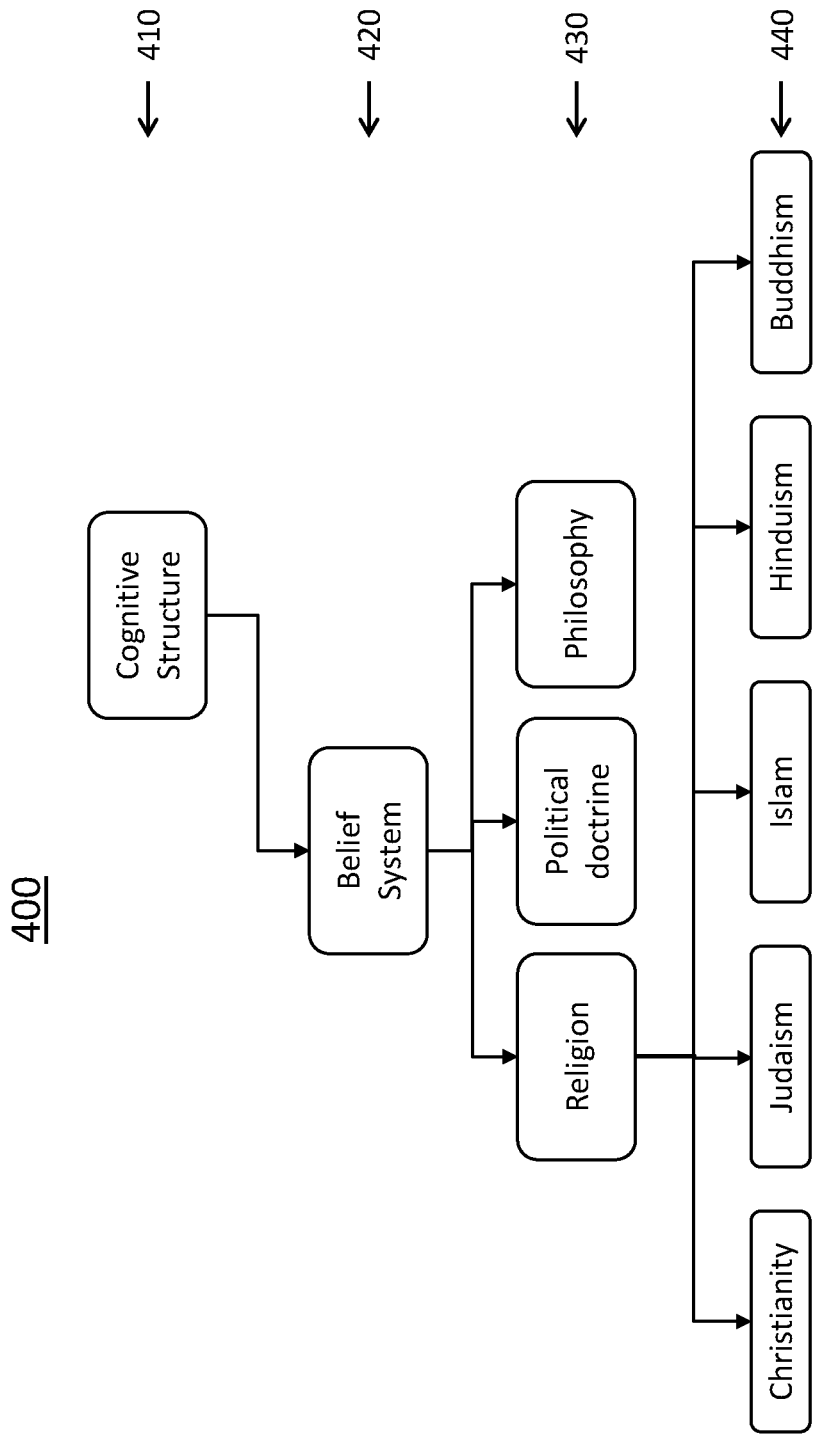
Figure 6:
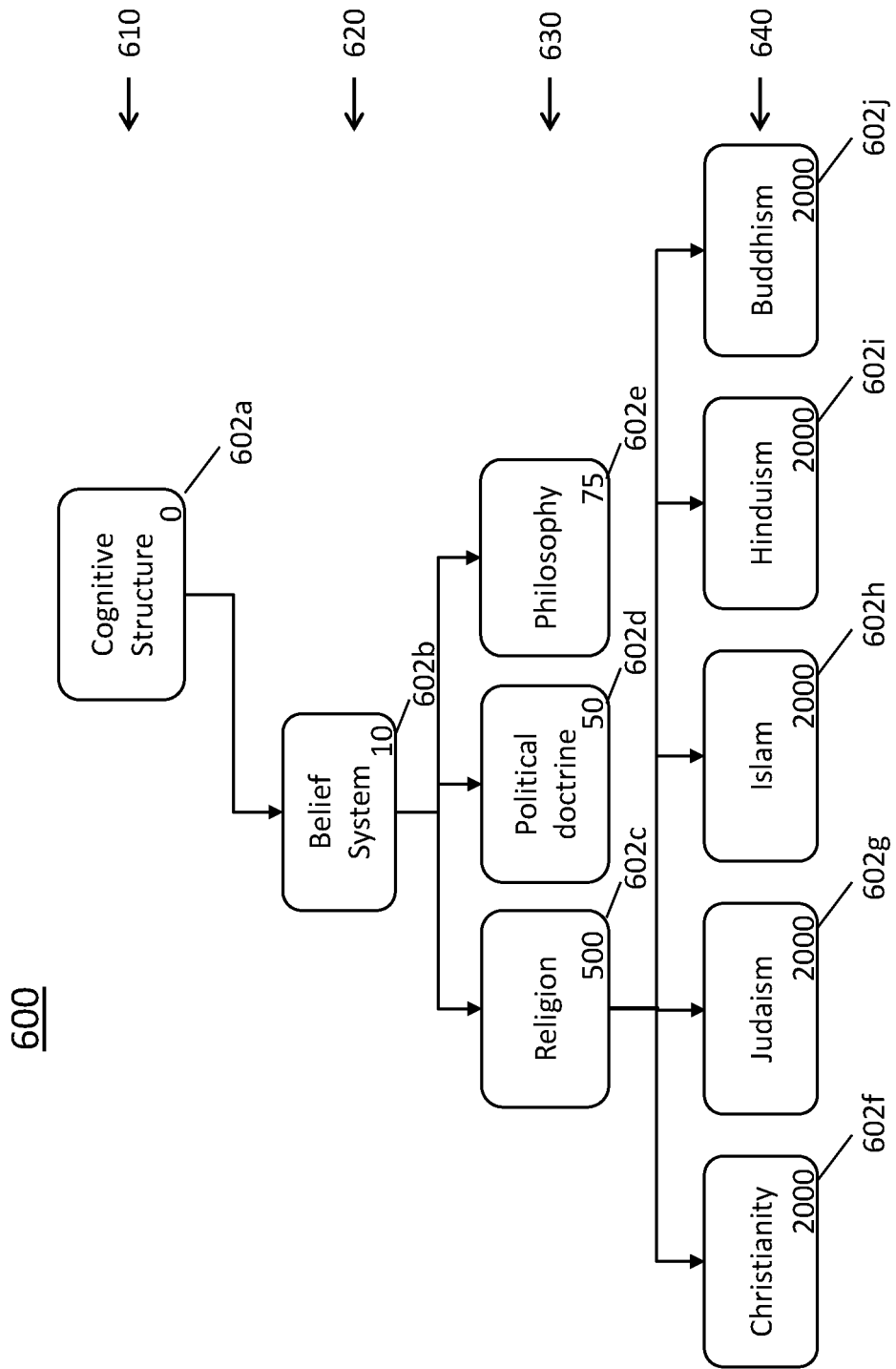

FIGS. 4, 5, and 6 are diagrams of exemplary predefined resources for obtaining an abstraction score for a word, according to various embodiments. As an example to illustrate the various embodiments of a predefined resource, consider a question about the dominant belief system in a certain group, for which an exemplary fragment of a taxonomy 400 is illustrated in FIG. 4. This is an abstract reference that may be addressed by specific descriptions of, for example, religion, political belief, philosophy, etc. As shown, there are four levels of the taxonomy 400: 410, 420, 430, and 440. The higher levels of the taxonomy 400 are highly abstract, while the lower levels become more concrete and more likely to directly occur as an answer. The abstraction score for a reference to a belief system would be high, because the entry is high (i.e., level 420) in the taxonomy 400. As described above, in one embodiment, this information is directly used to provide an abstraction score.

In another embodiment, as shown in FIG. 5, a curated list 500 of words and phrases is used to determine abstraction of a word (i.e., each word may be judged to be abstract if it appears on the list 500 and not abstract if it is not on the list 500).

In yet another embodiment, the taxonomy is used along with counts of occurrences of the words in the corpus 140 used by the QA system 108, an example of which is shown in diagram 600 of FIG. 6. As shown, the four levels of the taxonomy 600 are 610, 620, 630, and 640. Each word includes its count 602 of occurrences. According to this example, the term "philosophy" (occurrence count $602e$ is 75) is judged to be far more abstract than the term "religion" (occurrence count $602c$ is 500) although they occur at the same level 630 of the hierarchy, and both terms are more abstract than any specific religion shown in the level 640.

Returning to the flow diagram 300 of FIG. 3, the question words with abstraction scores are used, at 340, to determine a single abstraction score for the question as a whole. In an embodiment, to combine the abstraction scores of the words in the question into a single abstraction score for the question, a mathematical function may be applied to all of the scores, regardless of the role of the word in the question. For example, a maximum abstraction score may be used, an average score may be used, or a count of the words with abstraction over a given threshold may be used. In an embodiment, the words may be weighted based on the role of each word in the question. For example, a word identified as a lexical answer type (i.e., the specification of the type of the sought answer), the main verb, or any other role determined to be particularly significant in identifying factual answers, may be weighted more highly than other words in the question.

Now returning to the block diagram 200 of FIG. 2, the output score of the abstraction scorer 232, as described with reference to FIG. 3, is inputted into a determination block 234. In an embodiment, if the combined abstraction score of the question exceeds a configurable threshold, the question is judged to be highly abstract. In an embodiment with a yes/no determination of abstraction, the value may reflect a score being one rather than zero. In an embodiment with ranges of values for abstraction, the threshold may serve to distinguish between questions with a degree of abstraction sufficient to require additional processing. Once determined to be highly abstract, the question is inputted to the concrete alternative generator 240.

The concrete alternative generator 240 constructs a batch of questions expressing alternate concrete questions, the answers of which may satisfy the abstract goal. In an embodiment, a knowledge-based resource (i.e., abstraction resources 220) provides information about hierarchical concepts and words that express them. This may be a hierarchical taxonomy of concepts, as shown in FIG. 4, each with associated words. The concrete alternative generator 240 locates the abstract words of the question in the taxonomy 400 and travels down the hierarchy to a level identified as sufficiently concrete based on its distance from the top and/or bottom of the hierarchy. Variants of the question using descendants of the concrete words at these levels are created, combining the words from the different abstract words in the original question.

In another embodiment, the resource used by the concrete alternative generator 240 may include a taxonomy along with information about counts of words occurring in the corpus 140 of documents used by the QA system 108, as described above with respect to FIG. 6. The concrete alternative generator 240 locates the abstract words of the question in the taxonomy 600 and travels down the hierarchy from each of these words to the descendants that occur at least some threshold number of times. The threshold may be a configurable parameter. For each abstract word in the question, the descendants that pass the threshold and that have no ancestors that are also below the abstract word and that also pass the threshold are selected. Variants of the question using all of these selected descendants are created, combining the words from the different abstract words in the original question. The full set of variants constructed forms the recommended batch of questions.

The batch editor 250 assigns a weight to each alternate concrete question. In an embodiment, higher weights are assigned to questions generated from terms higher in the taxonomy (e.g., taxonomy 400 or 600) and lower weights to those generated from terms lower in the taxonomy. The lower weighted questions are more likely to be answered with high confidence. Answering a higher weighted question with higher confidence occurs if a document in the corpus 140 addresses the more abstract question. In an embodiment, the user assigns the weights to the questions.

According to an embodiment, user 202 is able to refine the weighted batch of questions, if desired. The batch editor 250 notifies the user 202, via the user interface provided to the user 202, that the question has been identified as highly abstract and that it has created a batch of concrete questions to express the intent of the original question. The user 202 is offered the opportunity to accept the batch as constructed; edit the batch by removing, changing, or adding questions; or reject the batch and resubmit the original question. The outcome of the decision of the user 202 becomes the input to the QA system 108. According to an embodiment, a system configuration parameter may be offered that causes this user-intervention operation to be skipped, streamlining the user's experience. In this case, the outcome of the weighted question batch by the batch editor 250 is the input to the QA system 108.

The QA system 108 performs question answering on each question in the weighted batch of questions. Questions may be run in parallel.

The output of the QA system 108 is provided to the answer aggregator 260, which aggregates the scored answers and/or passages returned for each question.

The answer re-ranker 270 rescores and re-ranks the responses according to their highest score for any question in the batch, scaled by the individual weight of the question. According to an embodiment, responses to the questions in the batch are compared. Answers that are deemed equivalent are merged. In an embodiment, answers that are completely identical to one another are merged. In another embodiment, a broader comparison, such as a measurement of string similarity or a synonym lookup, may be used to identify answers to merge. Merged responses are scored with the maximum weighted score from any of the individual responses being merged, according to an embodiment. The weighted score is the raw score times the weight assigned to that question. The remaining responses retain their scores from their individual question score, which are then scaled by the weight assigned to the individual question. The answer re-ranker 270 then re-ranks the responses in a single list, according to the weight scaled scores from this process.

The result is a weighted, ranked answer set 280, which is returned to the user 202 in the new order with an indication of the question or the questions in the batch that returned or produced the answer.

Figure 7:
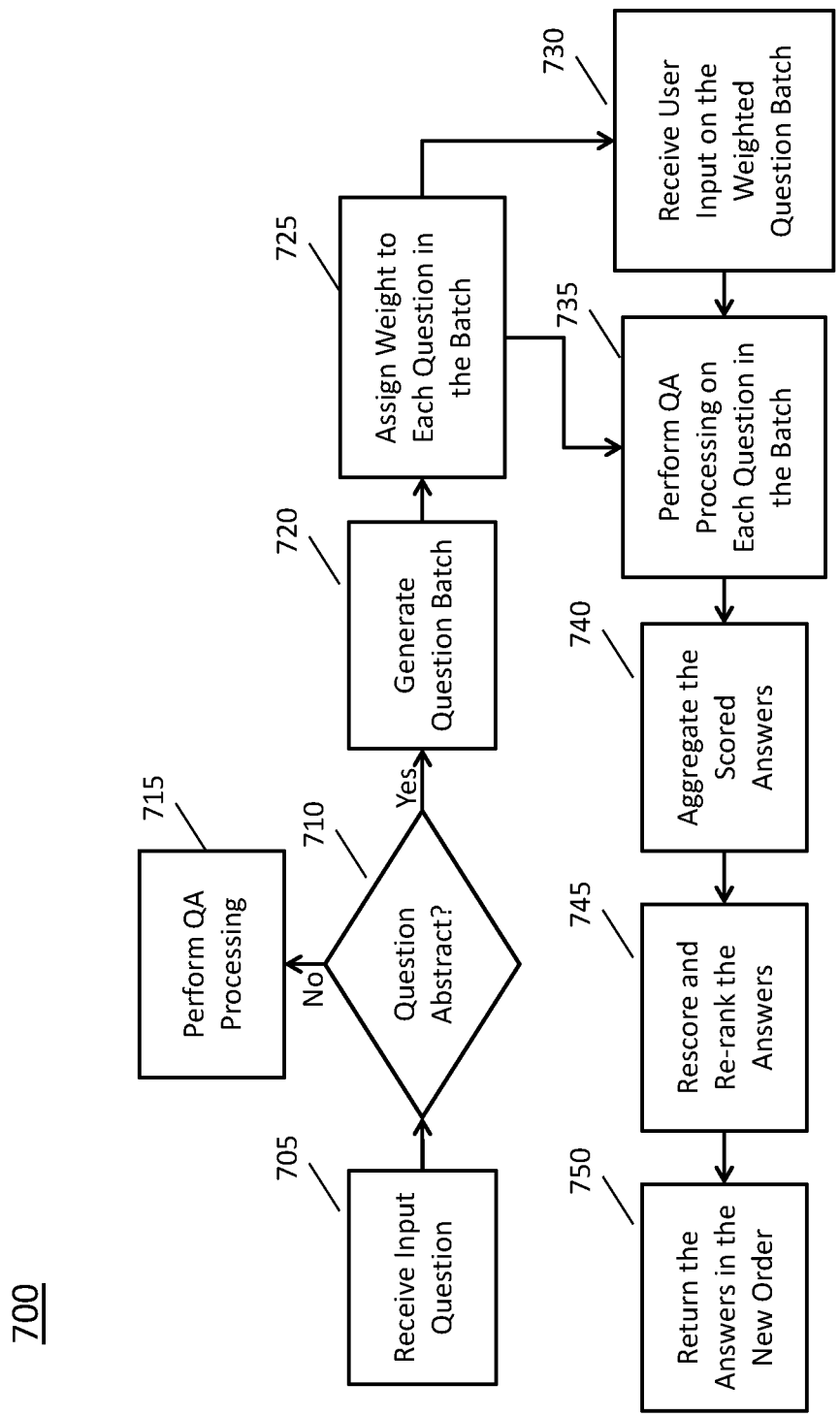
FIG. 7 is a flowchart of a method for answering general questions in an information handling system capable of answering questions, in accordance with an embodiment.

FIG. 7 is a flowchart 700 illustrating a method for answering general questions, in accordance with embodiments described herein.

At 705, an input question is received. At 710, the question is analyzed to determine if the question is abstract. As described above, abstraction resources 220 are utilized by an abstraction scorer 232 to score individual words in the question and to combine these values into a single abstraction measure for the question. This value is compared against a threshold to indicate if the question is abstract. If the determination at 710 is that the question is not abstract, at 715, normal question and answer processing is performed.

At 720, if the determination at 710 is that the question is abstract, a question batch is generated by the concrete alternative generator 240. The question batch comprises a batch of questions expressing alternate concrete questions, the answers of which may satisfy the abstract goal.

At 725, a weight is assigned to each alternate concrete question of the generated question batch by the batch editor 250.

At 730, user-input on the weighted question batch is received. As described above, the user 202 may accept the batch as constructed; edit the batch; or reject the batch and resubmit the original question. The outcome of the decision of the user 202 becomes the input to the QA system 108.

At 735, question-answering by the QA system 108 is performed on each question in the batch. 735 may proceed from 730 by processing the batch accepted, edited, or rejected (i.e., the original question) by the user, or from 725 if user input is not performed.

At 740, the scored answers from the QA system 108 are aggregated by the answer aggregator 260. At 745, the answer re-ranker 270 rescores and re-ranks the answers according to their highest score for any question in the batch, scaled by the weight of the individual questions.

At 750, the answers are returned in the new order, with an indication of the question instances that returned each one.

The system and methods for answering general questions, according to embodiments herein, advantageously identify abstract questions and accordingly generate a batch of questions, the answer to any of which may serve as the answer to the original question, rather than requiring a combination in order to answer the original question. The re-ranking, according to embodiments herein, based on weighting the individual concrete questions and scaling the answers proportional to the weight of the questions provides a convenient, usable weighted, ranked answer set to the user.

Figure 8:
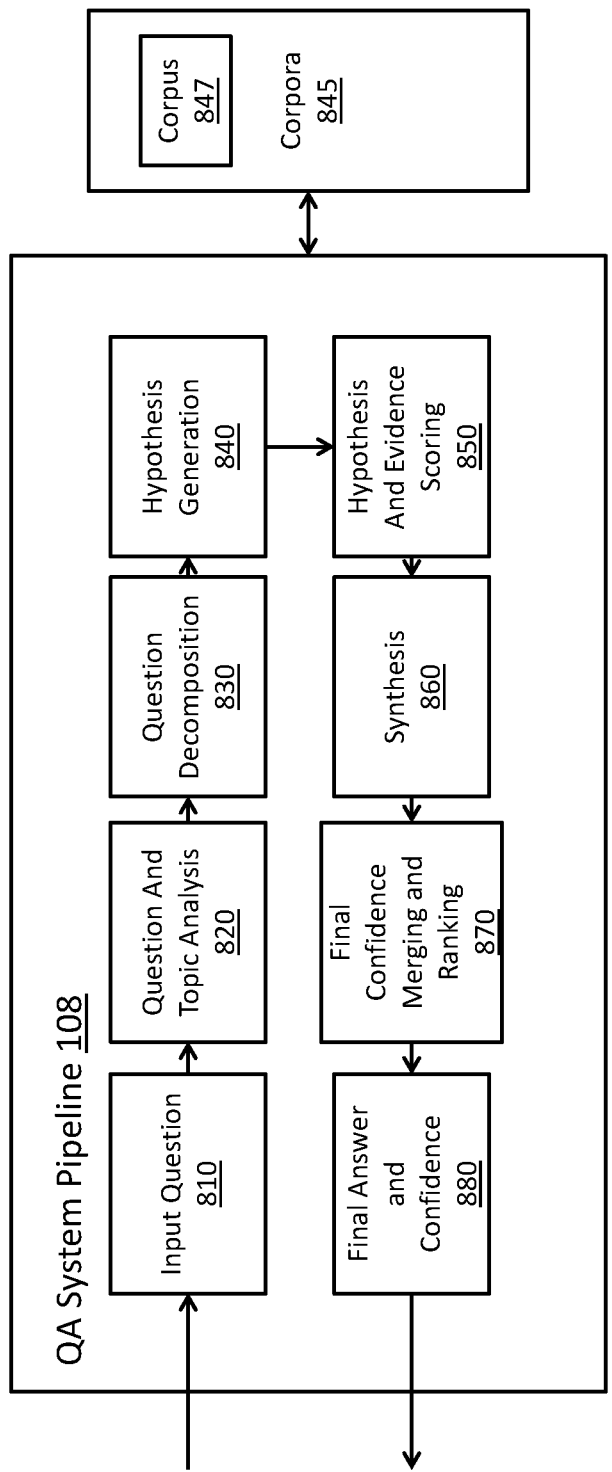
FIG. 8 illustrates a question and answer system pipeline, of a cognitive system, as may be used with embodiments described herein.

FIG. 8 illustrates a QA system pipeline 108, of a cognitive system, for processing an input question. The QA system pipeline 108 of FIG. 8 may be implemented, for example, as QA pipeline 108 of cognitive system 100 in FIG. 1. It should be appreciated that the stages as shown in FIG. 8 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems. Additional stages may be provided to implement the improved mechanism, or separate logic from the pipeline 108 may be provided for interfacing with the pipeline 108 and implementing the improved functionality and operations of the illustrative embodiments provided herein.

As shown in FIG. 8, the QA pipeline 108 comprises a plurality of stages 810-880 through which the cognitive system operates to analyze an input question and generate a final response. In an initial question input stage 810, the QA pipeline 108 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 108, i.e., the question and topic analysis stage 820, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referenced to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "What drug" since this phrase can be replaced with the answer, e.g., "Adderall," to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 8, the identified major features are then used during the question decomposition stage 830 to decompose the question into one or more queries that are applied to the corpora of data/information 845 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 845. That is, these various sources themselves, different collections of sources, and the like, represent a different corpus 847 within the corpora 845. There may be different corpora 847 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 847 within the corpora 845.

The queries are applied to one or more databases storing information about the electronic texts, documents, articles, websites, and the like, that make up the corpus of data/information, e.g., the corpus of data 140 in FIG. 1. The queries are applied to the corpus of data/information at the hypothesis generation stage 840 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 840, to generate hypotheses for answering the input question. These hypotheses are also referred to herein as "candidate answers" for the input question. For any input question, at this stage 840, there may be hundreds of hypotheses or candidate answers generated that may need to be evaluated.

The QA pipeline 108, in stage 850, then performs a deep analysis and comparison of the language of the input question and the language of each hypothesis or "candidate answer," as well as performs evidence scoring to evaluate the likelihood that the particular hypothesis is a correct answer for the input question. As described in FIG. 1, this involves using a plurality of reasoning algorithms, each performing a separate type of analysis of the language of the input question and/or content of the corpus that provides evidence in support of, or not in support of, the hypothesis.

Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

In the synthesis stage 860, the large number of scores generated by the various reasoning algorithms are synthesized into confidence scores or confidence measures for the various hypotheses. This process involves applying weights to the various scores, where the weights have been determined through training of the statistical model employed by the QA pipeline 108 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 108 that identifies a manner by which these scores may be combined to generate a confidence score or measure for the individual hypotheses or candidate answers. This confidence score or measure summarizes the level of confidence that the QA pipeline 108 has about the evidence that the candidate answer is inferred by the input question, i.e., that the candidate answer is the correct answer for the input question.

The resulting confidence scores or measures are processed by a final confidence merging and ranking stage 870 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 880, a final answer and confidence score, or final set of candidate answers and confidence scores, are generated and output to the submitter of the original input question via a graphical user interface or other mechanism for outputting information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
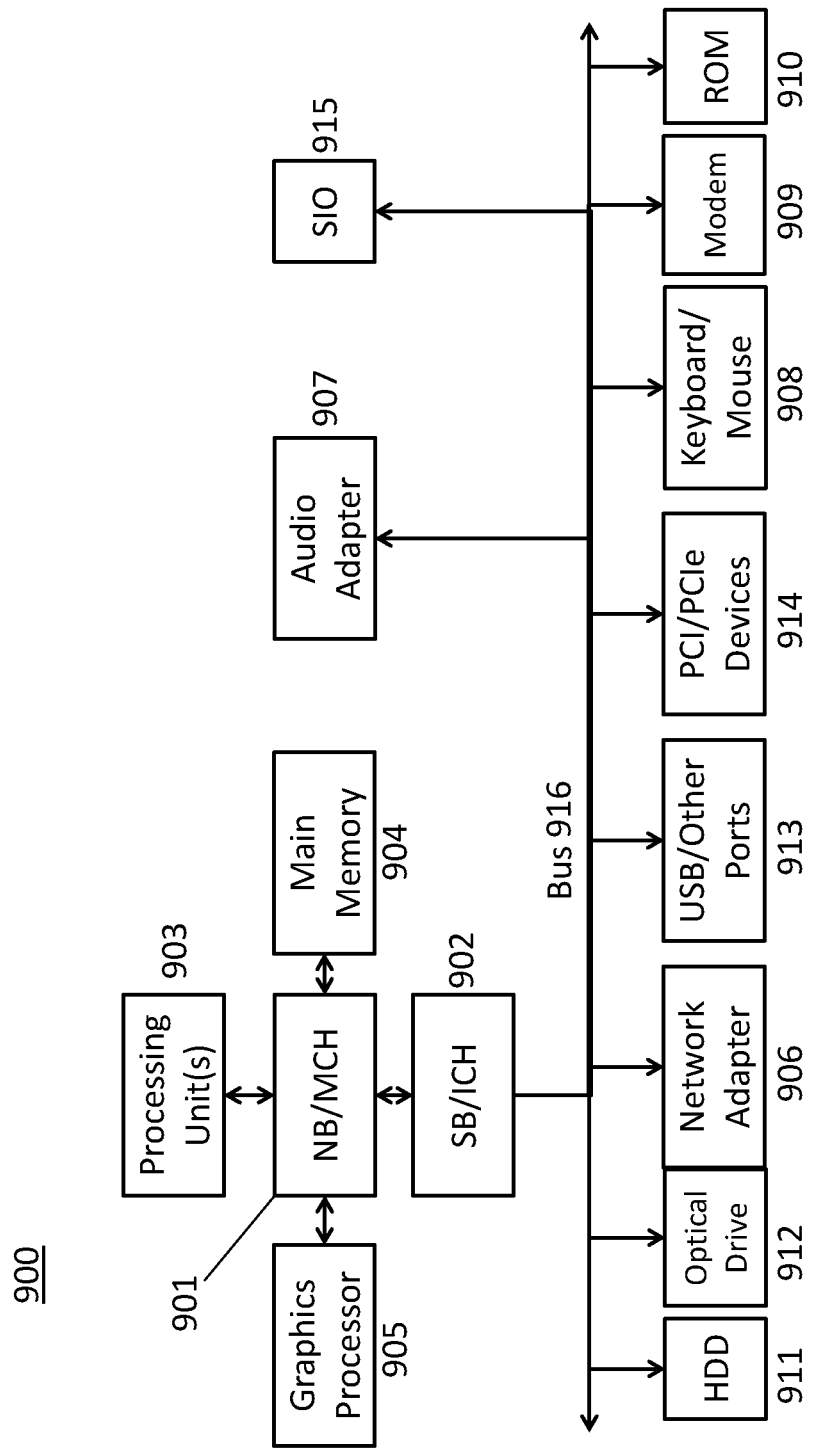
FIG. 9 is a block diagram of an example data processing system in which aspects of the illustrative embodiments are implemented.

FIG. 9 is a block diagram of an example data processing system 900 in which aspects of the illustrative embodiments are implemented. Data processing system 900 is an example of a computer, such as a server or client, in which computer usable code or instructions implementing the process for illustrative embodiments are located. In one embodiment, FIG. 9 represents a server computing device, such as a server, which implements the cognitive system 100 described herein.

In the depicted example, data processing system 900 can employ a hub architecture including a north bridge and memory controller hub (NB/MCH) 901 and south bridge and input/output (I/O) controller hub (SB/ICH) 902. Processing unit 903, main memory 904, and graphics processor 905 can be connected to the NB/MCH 901. Graphics processor 905 can be connected to the NB/MCH 901 through, for example, an accelerated graphics port (AGP).

In the depicted example, a network adapter 906 connects to the SB/ICH 902. An audio adapter 907, keyboard and mouse adapter 908, modem 909, read only memory (ROM) 910, hard disk drive (HDD) 911, optical drive (e.g., CD or DVD) 912, universal serial bus (USB) ports and other communication ports 913, and PCI/PCIe devices 914 may connect to the SB/ICH 902 through bus system 916. PCI/PCIe devices 914 may include Ethernet adapters, add-in cards, and PC cards for notebook computers. ROM 910 may be, for example, a flash basic input/output system (BIOS). The HDD 911 and optical drive 912 can use an integrated drive electronics (IDE) or serial advanced technology attachment (SATA) interface. A super I/O (SIO) device 915 can be connected to the SB/ICH 902.

An operating system can run on processing unit 903. The operating system can coordinate and provide control of various components within the data processing system 900. As a client, the operating system can be a commercially available operating system. An object-oriented programming system, such as the Java™ programming system, may run in conjunction with the operating system and provide calls to the operating system from the object-oriented programs or applications executing on the data processing system 900. As a server, the data processing system 900 can be an IBM® eServer™ System p® running the Advanced Interactive Executive operating system or the Linux operating system. The data processing system 900 can be a symmetric multiprocessor (SMP) system that can include a plurality of processors in the processing unit 903. Alternatively, a single processor system may be employed.

Instructions for the operating system, the object-oriented programming system, and applications or programs are located on storage devices, such as the HDD 911, and are loaded into the main memory 904 for execution by the processing unit 903. The processes for embodiments of the question and answer system pipeline 108, described herein, can be performed by the processing unit 903 using computer usable program code, which can be located in a memory such as, for example, main memory 904, ROM 910, or in one or more peripheral devices.

A bus system 916 can be comprised of one or more busses. The bus system 916 can be implemented using any type of communication fabric or architecture that can provide for a transfer of data between different components or devices attached to the fabric or architecture. A communication unit such as the modem 909 or the network adapter 906 can include one or more devices that can be used to transmit and receive data.

Those of ordinary skill in the art will appreciate that the hardware depicted in FIG. 9 may vary depending on the implementation. Other internal hardware or peripheral devices, such as flash memory, equivalent non-volatile memory, or optical disk drives may be used in addition to or in place of the hardware depicted. Moreover, the data processing system 900 can take the form of any of a number of different data processing systems, including but not limited to, client computing devices, server computing devices, tablet computers, laptop computers, telephone or other communication devices, personal digital assistants, and the like. Essentially, data processing system 900 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method for answering general questions in an information handling system capable of answering questions, the system comprising a processor and a memory comprising instructions executed by the processor, the method comprising:
   receiving a general question by a user;
   discarding one or more function words in the general question, wherein each of the one or more function words is a preposition, a conjunction, or an article;
   determining an abstraction score for each remaining word in the general question by comparing a hierarchical taxonomy of concepts with a location of a concept in the hierarchical taxonomy corresponding to each remaining word;
   determining a single abstraction score for the general question based on the abstraction score for each remaining word;
   determining that the general question is abstract based on the single abstract score;
   generating a first set of specific questions by generating a first specific question and a second specific question;
      wherein generating a first specific question comprises:
         determining an abstract word from the remaining words,
         identifying a first concrete word, wherein the first concrete word is a first word that is more specific than the abstract word, and
         replacing, in the general question, the abstract word with the first concrete word to generate the second specific question, and wherein generating a second specific question comprises:
         determining the abstract word,
         identifying a second concrete word, wherein the second concrete word is a second word that is more specific than the abstract word, and
         replacing, in the general question, the abstract word with the second concrete word to generate the second specific question;
   replacing the general question with a first set of specific questions generated based on the hierarchical taxonomy of concepts;
   running the first set of specific questions to obtain a set of specific answers to answer the general question; and
   returning at least one answer from the set of specific answers to the general question to the user.

2. The method of claim 1, further comprising:
   providing a user interface (UI) allowing the user to adjust the first set of specific questions to generate an adjusted set of specific questions;
   running the adjusted set of specific questions to obtain an adjusted set of specific answers;
   aggregating the adjusted set of specific answers based on weighting; and
   returning the adjusted set of specific answers in an aggregated form to the user.

3. The method of claim 2, wherein the weighting is based on a question weighting specific to each question in the first set of specific questions.

4. The method of claim 1, wherein the set of specific answers comprise evidence references.

5. The method of claim 1, wherein the information handling system supports open-domain questions.

6. The method of claim 1, the step of determining a single abstraction score for the general question based on the abstraction score for each remaining word further comprising:
   weighting the abstraction score for each remaining word based on a role of each remaining word, wherein one or more remaining words having a role of lexical answer type or a main verb is weighted higher than other one or more remaining words; and
   combining the weighted abstraction scores to determine the single abstraction score for the general question.

7. The method of claim 1, further comprising:
   generating a ranked list of specific answers by:
   for each specific questions of the first set of specific, assigning a weighting based on the specificity of the specific question's concrete term,
   for each specific answer of the set of specific answers, assigning a confidence score,
   for each specific answer of the set of specific answers, generating a weighted scaled score by scaling the confidence score of the specific answer by the weighting of the associated specific question, and
   generating a ranked list of specific answers by ranking the each specific answer of the set of specific answers based on the weighted scaled score; and
   returning the ranked list of specific answers to the user.

8. The method of claim 7, further comprising:
   returning the ranked list of specific answers to the user.

9. The method of claim 7, wherein the ranked list of specific answers comprises a specific answer having a highest ranking, the method further comprising:
   returning the specific answer having the highest ranking to the user.

10. A computer program product for answering general questions in an information handling system capable of answering questions, the computer program product comprising a computer readable storage medium having program instructions embodied therewith, the program instructions executable by a processor to cause the processor to:
   receive a general question by a user;
   discard one or more function words in the general question, wherein each of the one or more function words is a preposition, a conjunction, or an article;
   determine an abstraction score for each remaining word in the general question by comparing a hierarchical taxonomy of concepts with a location of a concept in the hierarchical taxonomy corresponding to each remaining word;
   determine a single abstraction score for the general question based on the abstraction score for each remaining word;
   determine that the general question is abstract based on the single abstract score;

generate a first set of specific questions by generating a first specific question and a second specific question;
wherein generating a first specific question comprises:
determining an abstract word from the remaining words,
identifying a first concrete word, wherein the first concrete word is a first word that is more specific than the abstract word, and
replacing, in the general question, the abstract word with the first concrete word to generate the first specific question, and
wherein generating a second specific question comprises:
determining the abstract word,
identifying a second concrete word, wherein the second concrete word is a second word that is more specific than the abstract word, and
replacing, in the general question, the abstract word with the second concrete word to generate the second specific question;
replace the general question with a first set of specific questions generated based on the hierarchical taxonomy of concepts;
run the first set of specific questions to obtain a set of specific answers to answer the general question; and
return at least one answer from the set of specific answers to the general question to the user.

11. The computer program product of claim 10, wherein the program instructions further cause the processor to:
provide a user interface (UI) allowing the user to adjust the first set of specific questions to generate an adjusted set of specific questions;
run the adjusted set of specific questions to obtain an adjusted set of specific answers;
aggregate the adjusted set of specific answers based on weighting; and
return the adjusted set of specific answers in an aggregated form to the user.

12. The computer program product of claim 11, wherein the weighting is based on a question weighting specific to each question in the first set of specific questions.

13. The computer program product of claim 10, wherein the set of specific answers comprise evidence references.

14. The computer program product of claim 10, wherein identifying the general question as abstract comprises:
utilizing a predefined resource to determine an abstraction score for each relevant word in the general question;
determining a single abstraction score for the general question based on the abstraction scores for each relevant word in the general question; and
comparing the abstraction score to a configurable threshold that indicates abstraction.

15. A system for answering general questions, the system comprising:
a memory comprising executable instructions; and
a processor configured to execute the executable instructions causing the processor to:
receive a general question by a user;
discard one or more function words in the general question, wherein each of the one or more function words is a preposition, a conjunction, or an article;
determine an abstraction score for each remaining word in the general question by comparing a hierarchical taxonomy of concepts with a location of a concept in the hierarchical taxonomy corresponding to each remaining word;
determine a single abstraction score for the general question based on the abstraction score for each remaining word;
determine that the general question is abstract based on the single abstract score:
generate a first set of specific questions by generating a first specific question and a second specific question;
wherein generating a first specific question comprises:
determining an abstract word from the remaining words,
identifying a first concrete word, wherein the first concrete word is a first word that is more specific than the abstract word, and
replacing, in the general question, the abstract word with first the concrete word to generate the first specific question, and
wherein generating a second specific question comprises:
determining the abstract word,
identifying a second concrete word, wherein the second concrete word is a second word that is more specific than the abstract word, and
replacing, in the general question, the abstract word with the second concrete word to generate the second specific question;
replace the general question with a first set of specific questions generated based on the hierarchical taxonomy of concepts;
run the first set of specific questions to obtain a set of specific answers to answer the general question; and
return at least one answer from the set of specific answers to the general question to the user.

16. The system of claim 15, wherein the executable instructions further cause the processor to:
provide a user interface (UI) allowing the user to adjust the first set of specific questions to generate an adjusted set of specific questions;
run the adjusted set of specific questions to obtain an adjusted set of specific answers;
aggregate the adjusted set of specific answers based on weighting; and
return the adjusted set of specific answers in an aggregated form to the user.

17. The system of claim 16, wherein the weighting is based on a question weighting specific to each question in the first set of specific questions.

18. The system of claim 15, wherein the set of specific answers comprise evidence references.

19. The system of claim 15, wherein the system supports open-domain questions.

20. The system of claim 15, wherein identifying the general question as abstract comprises:
utilizing a predefined resource to determine an abstraction score for each relevant word in the general question;
determining a single abstraction score for the general question based on the abstraction scores for each relevant word in the general question; and
comparing the abstraction score to a configurable threshold that indicates abstraction.

* * * * *